(12) United States Patent
Newton

(10) Patent No.: US 12,656,021 B2
(45) Date of Patent: Jun. 16, 2026

(54) CONCENTRATED SOLAR CEMENT KILN

(71) Applicant: Peter G Newton, Boise, ID (US)

(72) Inventor: Peter G Newton, Boise, ID (US)

( * ) Notice: Subject to any disclaimer, the term of this patent is extended or adjusted under 35 U.S.C. 154(b) by 437 days.

(21) Appl. No.: 17/249,101

(22) Filed: Feb. 19, 2021

(65) Prior Publication Data

US 2022/0268487 A1 Aug. 25, 2022

(51) Int. Cl.
*F24S 20/20* (2018.01)
*C04B 7/43* (2006.01)

(52) U.S. Cl.
CPC ................ *F24S 20/20* (2018.05); *C04B 7/43* (2013.01)

(58) Field of Classification Search
CPC ........... Y02P 40/121; F24S 20/20; C04B 7/43
USPC .......................................................... 126/569
See application file for complete search history.

(56) References Cited

U.S. PATENT DOCUMENTS

| | | | | |
|---|---|---|---|---|
| 4,338,922 A | * | 7/1982 | Moore ..................... | F24S 20/30 |
| | | | | 126/714 |
| 4,443,186 A | * | 4/1984 | Shell ........................ | F26B 3/28 |
| | | | | 432/103 |
| 4,706,651 A | * | 11/1987 | Yudow .................... | F24S 23/10 |
| | | | | 126/681 |
| 9,586,190 B1 | * | 3/2017 | Ermanoski ............... | B01J 8/087 |
| 2018/0316306 A1 | * | 11/2018 | Magklaras .............. | F24S 23/77 |

FOREIGN PATENT DOCUMENTS

| | | | | | |
|---|---|---|---|---|---|
| CN | 209166069 U | * | 7/2019 | | |
| DE | 10343861 A1 | * | 4/2005 | ............ | B01J 19/127 |
| EP | 3142980 B1 | * | 1/2019 | ............ | B02C 23/00 |
| JP | 2011098857 A | * | 5/2011 | | |

OTHER PUBLICATIONS

Tescari et al., "Solar rotary kiln for continuous treatment of particle material: Chemical experiments from micro to milli meter particle size," Published online Dec. 11, 2020, Whole Document (Year: 2020).*
Moumin et al., "Solar treatment of cohesive particles in a directly irradiated rotary kiln," Published online Mar. 8, 2019, Whole Document (Year: 2019).*
2005.*

* cited by examiner

*Primary Examiner* — Avinash A Savani
(74) *Attorney, Agent, or Firm* — Pedersen & Company, PLLC; Ken J. Pedersen; Barbara S. Pedersen

(57) ABSTRACT

The subject invention combines two long-established technologies—cement kilning and solar radiation concentration—to create a new process to kiln cements that will significantly reduce the non-renewable energy consumption and pollution and $CO_2$ generation of current cement kilning methods. The process entails using focused solar radiation to heat closed, sealed containers containing cement raw materials to kiln the raw materials to produce cement, including Portland cement.

7 Claims, 4 Drawing Sheets

CONCENTRATED SOLAR CEMENT KILN

CROSS-REFERENCE TO RELATED APPLICATIONS

None.

FEDERALLY SPONSORED RESEARCH OR DEVELOPMENT

Not Applicable.

COMPACT DISC INDEX

Not Applicable.

BACKGROUND OF THE INVENTION

This invention pertains to the production of mineral cements, including Portland cement, via kilning.

Currently, Portland cement kilning produces a significant percentage of the total worldwide emissions of $CO_2$ (carbon dioxide) and mercury, and up to 500,000 tons per year of sulfur dioxide, nitrogen oxide, carbon monoxide, and other air pollutants. As of 2020, cement kilning is estimated to annually produce more than 1.5 billion tons of carbon dioxide, representing more than 5% of total global human-generated $CO_2$ emissions, and more than 2,000 tons of gaseous mercury emissions, approximately 11% of the total annual global anthropogenic mercury emissions.

The concentrated solar cement kiln described herein is a novel combination of two well-established technologies, using focused (concentrated) solar energy as a primary heat source, and kilning the cement in closed containers to contain pollutants emitted by the raw materials while kilning.

The concentrated solar cement kiln described herein will substantially reduce the emission of $CO_2$, mercury, and other air pollutants by significantly reducing the amount of fossil fuel combustion required and by containing the gases emitted by the raw materials during the kilning.

BRIEF SUMMARY OF THE INVENTION

The unique combination identified herein is the kilning of cement in closed containers principally heated with focused solar radiation.

The other process components in the attached sketches are not fundamental to the invention and are shown as feasible alternatives available for an embodiment of the unique combination to accomplish the central objective of using concentrated solar energy to kiln cement in closed containers, without the suggestion that the other process components are new or unique or the only options available to implement the unique combination shown herein.

Portland cement is currently mainly produced by heating and tumbling the raw materials in a rotary kiln in an open flame produced by the combustion of a fossil fuel. This results in the largely uncontrolled release of both the pollutants emitted by the minerals being kilned as well as the pollutants and greenhouse gases produced by the combustion.

This invention will kiln the raw materials in closed, sealed rotating containers primarily heated by focused solar energy, thereby eliminating many of the byproduct pollutants and significantly reducing the nonrenewable energy currently required to kiln cement.

The accompanying illustrative sketches show an embodiment portraying rotating kilning "barrels" being carried through the focused solar radiation on carts on rails, with focusing mirrors surrounding and above the path of the carts. These are considered to be feasible, and perhaps the best, methods of accomplishing the principal objective, but are not considered fundamental components of this invention except as combined into an embodiment of the unique combination/process that is shown in FIGS. 1-4.

BRIEF DESCRIPTION OF THE DRAWINGS

The attached drawings, In FIGS. 1-4, the sunlight focusing mirrors are shown in a ground-mounted array surrounding the cart tracks with additional mirrors above the cart path to focus the solar radiation on the cart-carried rotating barrels. FIG. 1 includes indication of a general purpose "Processing/Staging/Loading/Unloading Area" adjacent to the mirror/reflector arrays and "Transport Rail, Typ.", both showing non-unique associated general infrastructure to support the proposed unique process.

Brief description of FIG. 2 (Cross section "FIG. 2" viewed as indicated on the upper, plan view of FIG. 1): FIG. 2 is a side elevation view showing the cement kilning barrels being towed through the concentrated solar focal zone on carts on elevated tracks.

FIG. 2 shows downward facing focusing mirrors integral to a roof structure covering the cart rails. FIG. 2 includes an identifying note and schematic of a non-unique roof above the car track. The roof shown is a schematic of general infrastructure to support the proposed unique process and is not considered a fundamental component of this invention except when combined into the FIG. 1-4 embodiment of said unique combination/process.

Brief description of FIG. 3: (Cross section "FIG. 3" indicated on the upper, plan view FIG. 1): FIG. 3 is a front elevation view showing the cement kilning barrels being towed on carts on elevated tracks, with focusing mirrors shown on each side of the tracks and on the underside of the roof structure above the track and carts. FIG. 3 includes identifying notes and a schematic of a non-unique support structure for reflectors and a roof, as well as the roof itself above the car track. The support structure and roof shown is a schematic of general infrastructure to support the proposed unique process. The mirror and roof support structure is a component of the unique process, however, the construction details of the support structure and roof are not proposed to be unique so are indicated schematically.

FIG. 4 is an enlarged detail of the dashed-line-circled area of FIG. 3.

Specific details not needed to define the invention are not shown or specified in the attached sketch.

DETAILED DESCRIPTION OF INVENTION

The unique combination identified herein is the kilning of cement in closed containers principally heated with focused solar radiation. More specifically, this invention pertains to a concentrated solar cement kiln for production of kilned cement using concentrated solar radiation to substantially reduce the environmental impacts of cement production. An embodiment of the invention may be described as a combination of elements/components for, and/or plan of, kilning cement in (1) closed containers (2) principally heated by concentrated solar radiation projected onto the closed containers by focused mirror arrays.

The process shown in FIGS. 1-4 and described herein is an embodiment of said unique combination/process and entails moving closed, sealed containers containing the raw materials through a solar radiation focal zone, with the containers carried on, and being rotated by, carts on an elevated rail.

Figure 1:
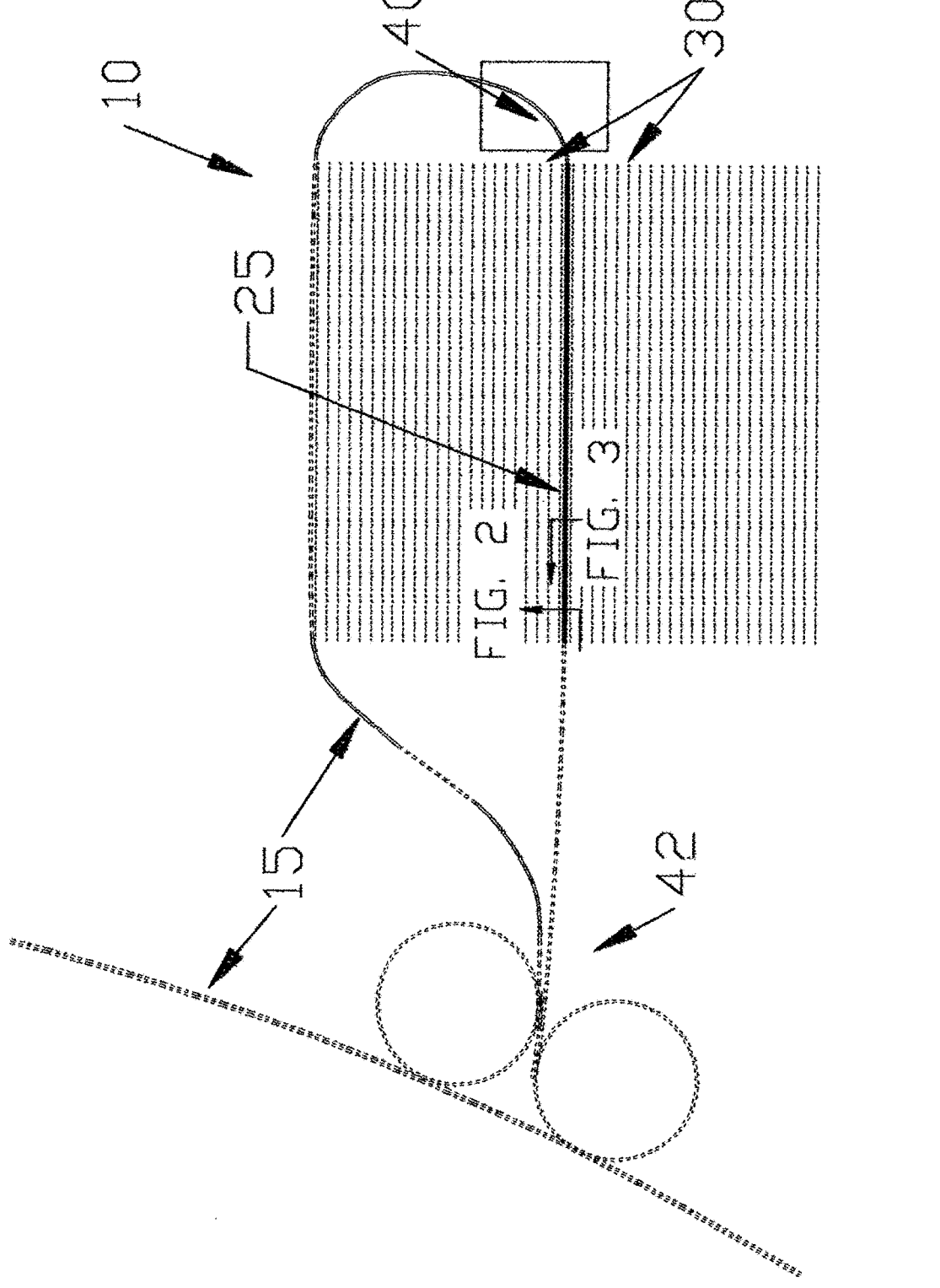
FIGS. 1-4, illustrate an embodiment of the unique combination/process, showing a method of implementing the fundamental concept by carrying closed, sealed, rotating, barrels containing the cement raw materials, through focused solar radiation provided by mirrors/reflectors. The rotating barrels are shown to be carried on carts on elevated rails with the carts towed by a tractor on adjacent ground-level rails. The motive power for the tractor is not defined and is not significantly important to the fundamental concept. In the concept shown in the attached Figures, the barrel rotation would be accomplished via rollers integral to the rail-mounted carrying carts, with the rollers driven by the turning of the cart wheels.

Referring specifically to the Figures, the schematically portrayed elements/components are labeled with reference numbers and letters as follows. FIG. 1 portrays a unique combination/process embodiment 10 that includes a transport rail 15 carrying closed, sealed, rotating, barrels 20 (see FIGS. 2-4) containing cement raw materials through a concentrated focal zone 25 of focused solar radiation gathered from the ground-mounted sunlight-focusing mirror/reflector arrays 30. Supplemental heating 40 may be provided, as needed. A processing/staging/loading/unloading area 42 and associated portions of the transport rail 15 may be used for staging, loading, and unloading of the barrels 20 and further processing of the kilned contents of the barrels as needed to supply kilned cement to users, as will be understood by those of skill in the art.

Figure 2:
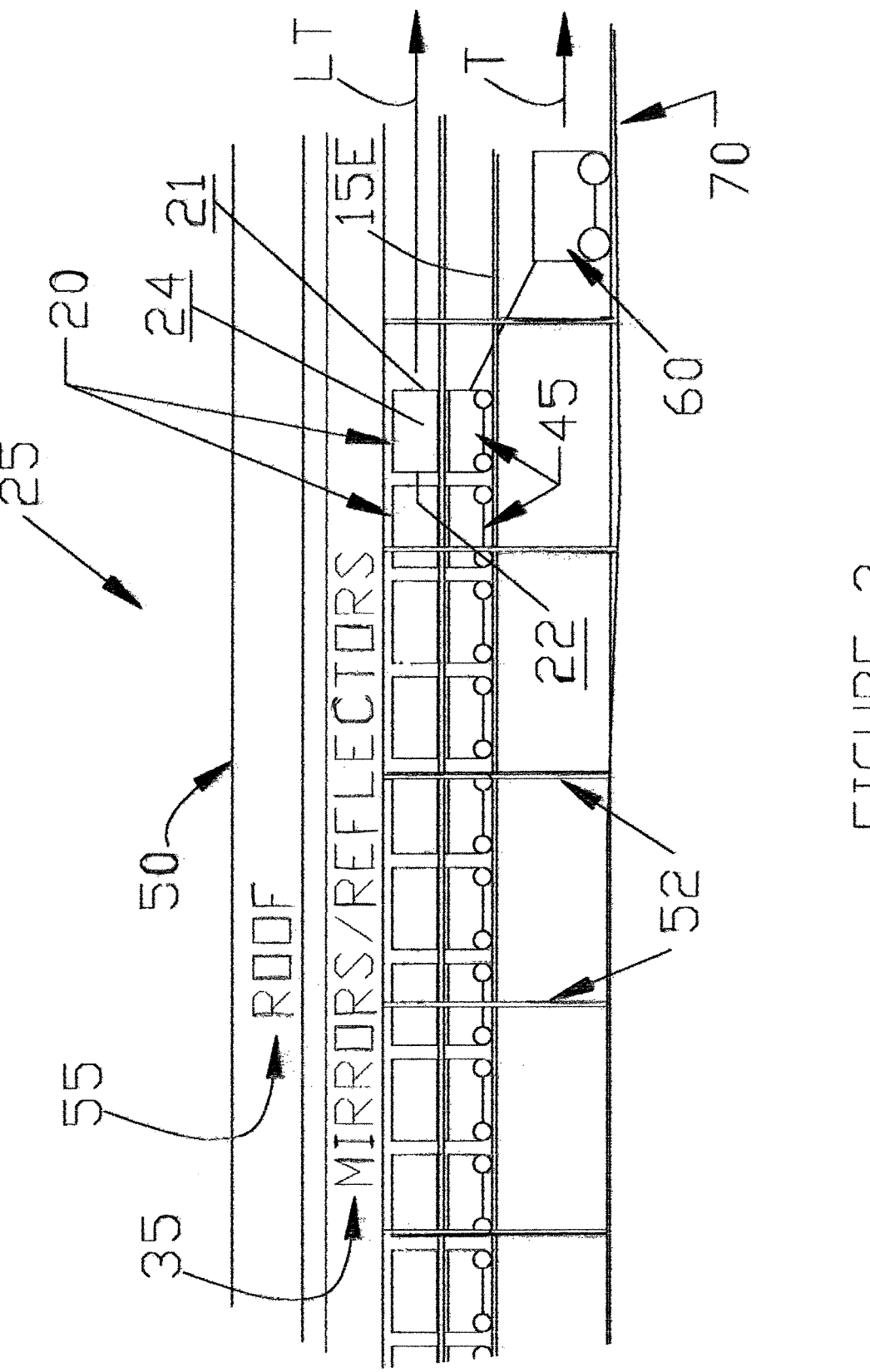

Cross-sectional elevation view FIG. 2, viewed along the line/arrow "FIG. 2" in FIG. 1, portrays closed, sealed, rotating, kilning barrels 20 carried on carts (or "cars") 45 on the elevated track potion 15E through the concentrated solar focal zone 25. The carts 45 are towed by a tractor 60 on adjacent ground-level rails 70. Focusing structure 50 includes support structure 52 supporting a roof 55 and mirrors/reflectors above and along the cart path in the focal zone 25. Mirrors/reflectors 35 are on the underside of the roof (FIGS. 2-4) and mirrors/reflectors 37 are on each side of the barrel-cart combination to focus the solar radiation onto the cart-carried rotating barrels 20.

Figures 3, 4:
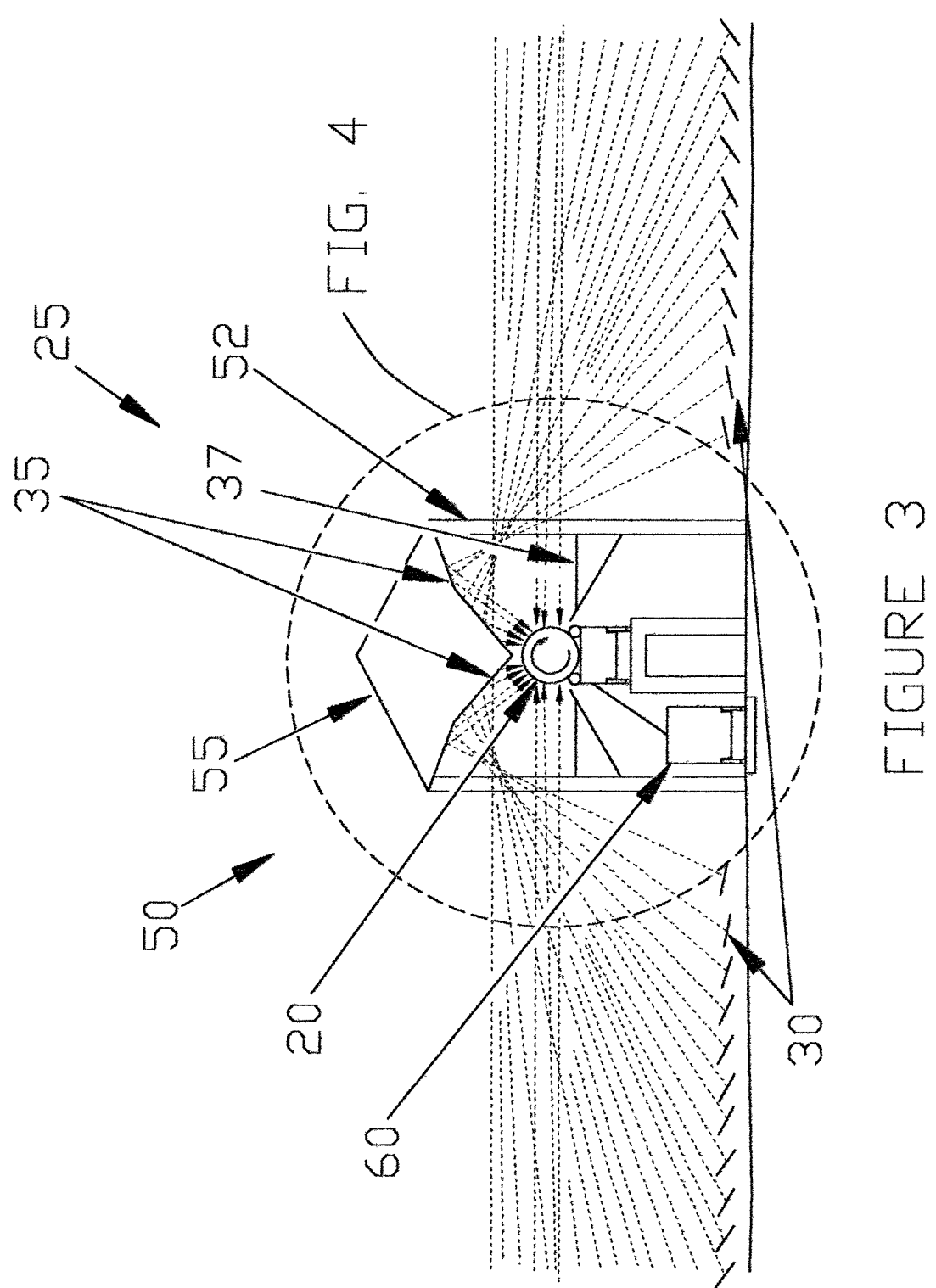
Figure 4:
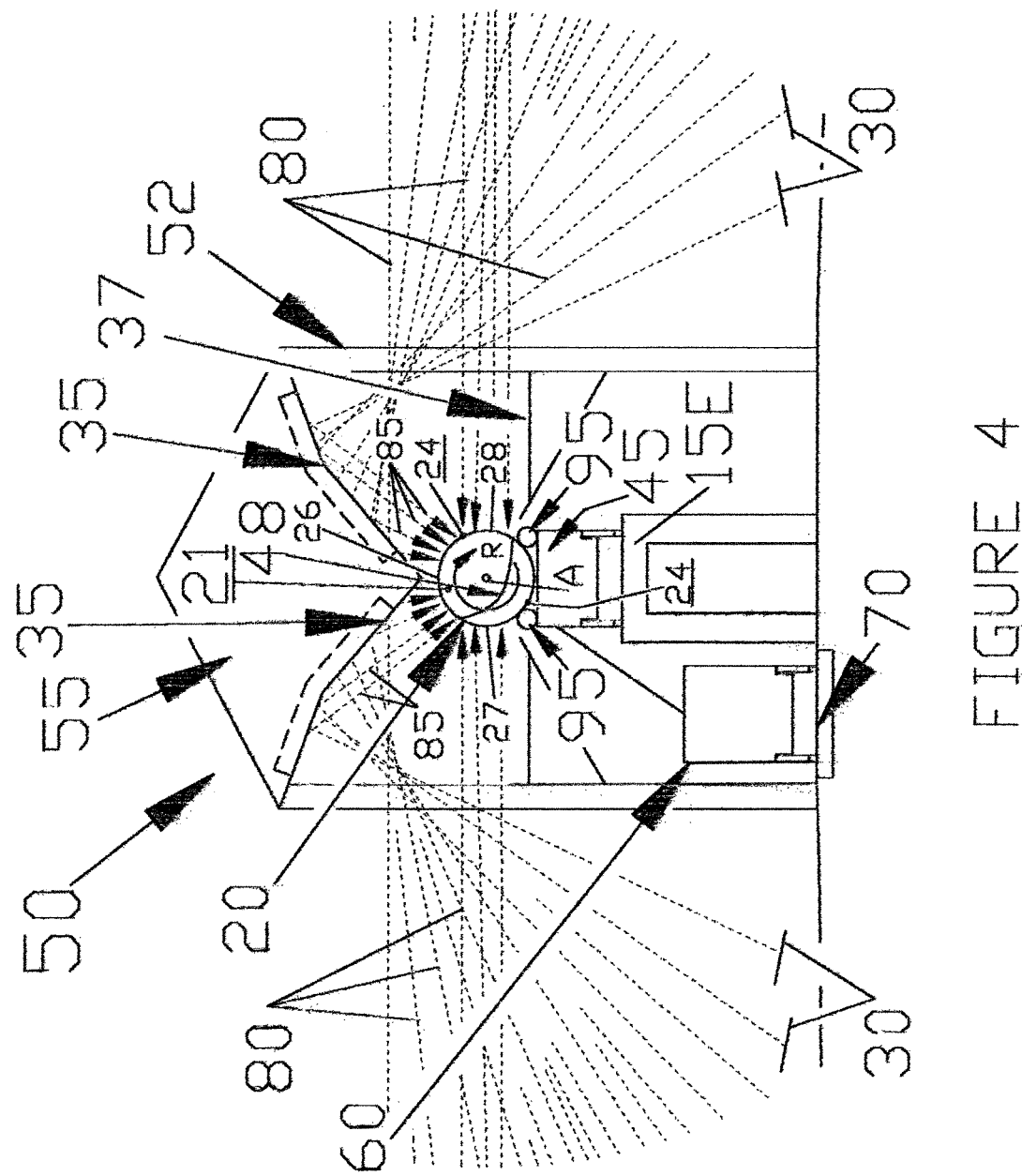

FIGS. 3 and 4 are, respectively, a cross-sectional elevation view of area 10 viewed along line/arrow "FIG. 3" in FIG. 1, and an enlarged detail view of the area circled in FIG. 3. FIGS. 3 and 4 show a cart (or "car") 45 on elevated rail track potion 15E under the roof 55, the tractor 60 on ground-level rails 70 towing the cart 45, and the sealed, rotating kilning barrel 20 on top of the cart 45. See the barrel rotation arrow R and the schematically portrayed cement raw materials 48 in enlarged FIG. 4. FIGS. 3 and 4 show to best advantage the focusing structure 50 including the support structure 52, roof 55, and downward-facing mirrors/reflectors 35 supported by the roof 55, and the additional mirrors/reflectors 37. As indicated by the tractor motion arrow T at the right side of FIG. 2, the carts 45 and barrels 20 pass through the concentrated solar focal zone 25 under the roof 55 and therefore under the downward-facing mirrors/reflectors 35 and alongside the mirrors/reflectors 37.

FIG. 4 shows to best advantage how the downward-facing focusing mirrors/reflectors 35 receive solar radiation 80 from the mirror/reflector arrays 30, and focus the concentrated solar radiation 85 onto the closed, sealed barrels 20 as the barrels 20 are transported through the focal zone 25. The rollers 90 rotating the barrels 20 are driven by the rotating cart wheels 95 during transport.

It may be seen in FIGS. 3 and 4 that the concentrated solar radiation 85 is directed onto an exterior surface of each barrel 20, for kilning the cement raw materials 48 contained in the barrel, whereby pollutants gases emitted by the cement raw materials during the kilning are contained in the closed, sealed barrels. It may be seen in FIGS. 3 and 4 that the ground-mounted arrays of mirrors reflect solar radiation 80 up to mirrors/reflectors 35 in the focal zone above the barrels that reflect the solar radiation 85 down onto the barrels 20. Further, it may be seen in FIGS. 2-4 that each barrel 20 has a longitudinal rotational axis A around which the barrel rotates and two end surfaces 21, 22, and that said exterior surface of each barrel onto which the concentrated solar radiation is directed is an exterior circumferential surface 24 extending between said two end surfaces 21, 22. By comparing FIGS. 2 and 3, it is apparent that the barrel exterior circumferential surface 24 of the Figures is an exterior cylindrical surface. It will be understood from the Figures that, as the barrel is rotated on said longitudinal rotational axis A and transported through the focal zone 25, said concentrated solar radiation 85 Fis directed onto the exterior circumferential surface 24 of the barrel 20, for example, onto the top side 26, right side 27, and left side 28 of the exterior circumferential surface of the barrel 20 as shown in FIG. 4. It will be understood from the Figures that the rotating barrels and carts are transported through the focal zone 25 in the direction of tractor motion arrow T, which is parallel to the longitudinal rotational axis A, so said transport may be described as longitudinal transport LT (FIG. 2) of the barrels through focal zone 25.

As indicated in the attached sketch (FIG. 1), it is expected that some amount of supplemental heating 40 is likely to be required. It is expected that this would be provided as the containers pass out of the solar radiation focal zone 25 and that this supplemental heat would likely be via fossil-fueled burners.

The invention claimed is:

1. A process for the kilning of cement using concentrated solar radiation to reduce environmental impacts of cement production, the process comprising:

Providing closed, sealed barrels, containing cement raw materials and having a longitudinal rotational axis, two end surfaces, and an exterior circumferential surface extending between said two end surfaces; and Kilning said cement raw materials to produce cement, by rotating said barrels on said longitudinal rotational axis, and transporting said barrels longitudinally through a focal zone comprising concentrated solar radiation from ground-mounted mirror arrays beside the focal zone, wherein said ground-mounted arrays of mirrors reflect solar radiation up to mirrors in the focal zone above the barrels so that said concentrated solar radiation is directed onto the exterior circumferential surface of each barrel, whereby pollutant gases emitted by the cement raw materials during the kilning are contained in the closed, sealed barrels.

2. The process of claim 1, wherein said pollutant gases emitted by the cement raw materials during the kilning that are contained in the closed, sealed barrels comprise mercury.

3. The process of claim 1, wherein said concentrated solar radiation is directed onto a top side, a right side, and a left side of the exterior circumferential surface of the barrel as the barrel is rotated on said longitudinal rotational axis and transported longitudinally through the focal zone.

4. The process of claim 3, wherein the barrels are on carts traveling longitudinally through the focal zone.

5. The process of claim 4, wherein the focal zone comprises a support structure having a roof under which the carts travel, and said mirrors in the focal zone are supported under the roof and are downwardly-facing toward the barrels on the carts.

6. The process of claim 5, wherein the carts are towed by a tractor on rails.

7. The process of claim 5, wherein the carts are on elevated rails and are towed by a tractor on adjacent ground-level rails.

\* \* \* \* \*